Jan. 31, 1928.

J. A. ALBERTONI 1,657,987

SWINGING JOINT

Filed Aug. 20, 1923

John A. Albertoni Inventor

By F. E. Shuman

Attorney

Patented Jan. 31, 1928.

1,657,987

UNITED STATES PATENT OFFICE.

JOHN A. ALBERTONI, OF CLEVELAND, OHIO.

SWINGING JOINT.

Application filed August 20, 1923. Serial No. 658,226.

This invention relates to new and useful improvements in swinging pipe joints and has for its object the provision of a swinging joint whereby two tubular members may be operatively connected so as to permit a free swinging movement of one member relative to the other.

A further object of the invention is to provide a swinging conduit joint of simple, durable construction which may be manufactured at a low cost and which will permit a free swinging movement of one conduit relative to another and is adapted to carry fluid under high pressure without leakage.

A still further object is to provide a swinging pipe joint having a globular expansion chamber into which the inlet pipe projects and to provide a new and improved packing gland comprising a novel arrangement of parts whereby packing may be placed in position around the inlet pipe without removing the swinging portion of the joint therefrom.

An additional object is to provide a swinging pipe joint having a practical packing gland provided with means whereby the same may be adjusted to compensate for wear and to provide additional means for securing the parts in assembled relation whereby an easily operable pipe joint is provided which will stand great pressure.

The above and additional objects are accomplished by the novel construction, combination and arrangement of parts hereinafter described and illustrated in the accompanying drawings wherein I have shown a preferred form of the invention, it being understood that the same is capable of various adaptations and that changes and modifications may be made or substitutions resorted to which come within the scope of the claim hereunto appended.

The particular adaptation of the invention disclosed in the drawings is intended for use on the pumps or other apparatus ordinarily used for dispensing fuel to automobiles or other motor vehicles, but it is to be understood that the same may be used to provide a swinging joint or conduit carrying steam, water, gas, air or other fluid.

In the drawings in which like characters of reference are used to designate like parts as the same may appear in any of the several views and in which:—

Figure 1:
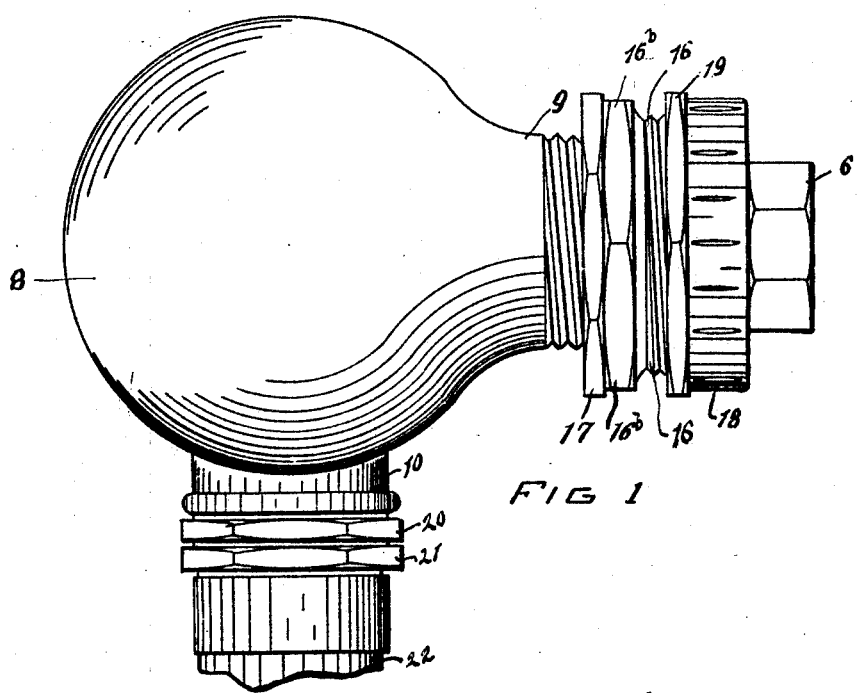
Figure 1 is a side elevational view of a pipe joint constructed in accordance with this invention.
Figure 2:
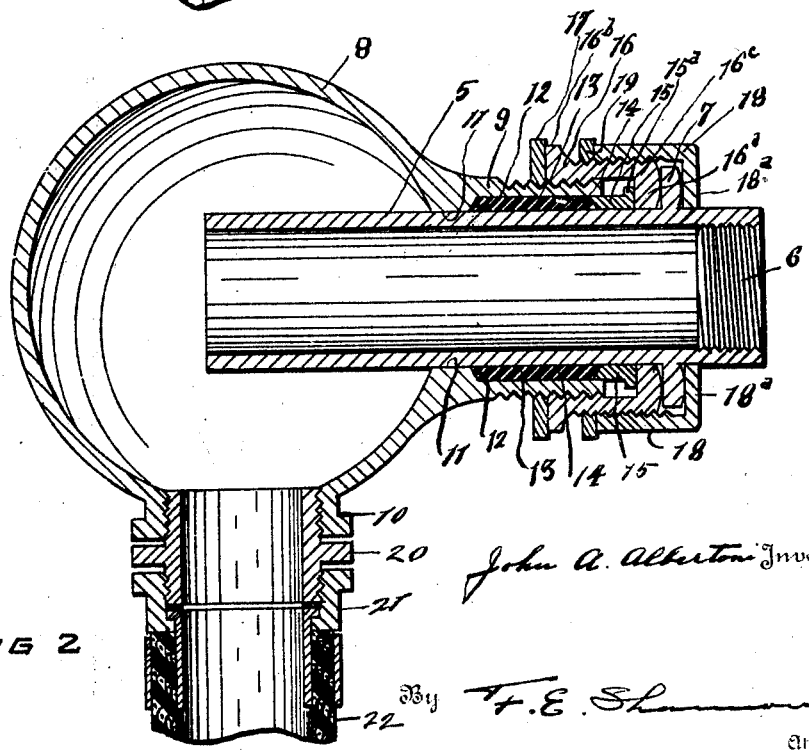
Figure 2 is a central, vertical, longitudinal sectional view of same.

Proceeding now to a detailed description of the invention with reference to the particular adaptation thereof disclosed in the drawings, the numeral 5 denotes a pipe which is internally threaded at the forward end thereof with the screw threads 6, whereby it may be operatively attached to the delivery nozzle of a liquid fuel serving device or any conduit or other tubular member.

The tube is provided adjacent the forward end thereof with an annular flange 7 which is formed thereon for a purpose hereinafter set forth. The numeral 8 denotes a hollow globe which is provided with an externally threaded inlet extension 9 and with the internally threaded outlet extension 10. The extensions 9 and 10 project radially from the globe 8 with the axis of the inlet extension disposed at a right angle to the axis of the outlet extension.

The inlet extension is provided with a bore 11 adapted to snugly receive the pipe 5 which is fitted therein. The bore 11 is enlarged adjacent the outer end thereof to form the inclined offset shoulder 12, thus providing a packing space or gland 13 between the pipe 5 and the interior face of the extension 9, in which is positioned the packing 14. The numeral 15 denotes a cylindrical ring which is fitted over the pipe 5 and fitted into the packing gland 13. The inner axial face of the ring 15 is oppositely inclined in relation to the inclined shoulder 12. The ring 15 is also provided at the forward edge thereof with an annular flange 15ª which is arranged thereon to engage the forward face of the extension 9 to prevent the ring 15 from being forced entirely within the gland 13.

The numeral 16 denotes an internally threaded collar which is operatively threaded on the extension 9. The collar 16 is provided at the forward edge thereof with an inwardly projecting annular flange 16ª which is fitted around the pipe 5 and engages the forward edge of the ring 15. The collar 16 is provided at the rear end thereof with an outwardly projecting annular flange 17 which is provided with oppositely arranged flat faces for the purpose of providing wrench engaging surfaces.

To tightly pack the packing 14 around the pipe 5 the flange 16^b is engaged by wrench and the collar is operated to force the ring 15 into the packing chamber 13, thus securely sealing the joint between the extension 9 and the pipe 5. The numeral 17 denotes a lock nut which is threaded on the extension 9 and is operated against the collar 16 to secure the same in position on the extension 9. The collar is also externally threaded adjacent the forward end thereof with the screw threads 16^c and an internally threaded retaining ring 18 is operatively threaded thereon. The retaining ring 18 is provided with a forwardly projecting annular flange 18^a which is fitted around the pipe 5. The flange 7 is positioned between the flanges 16^a and 18^a and means is thus provided for securing the pipe 5 against longitudinal movement in the extension 9. The numeral 19 denotes a lock nut which is threaded on the collar 16 and is operated against the ring 18 to secure the same in a proper position thereon.

A hose 22 having an internally threaded socket 21 is secured on the connecting nipple 20 which is operatively threaded in the inlet extension 10. An important feature of the invention lies in the fact that the collar 16 may be unscrewed from the extension 9 and the globe 8 moved outwardly on the pipe 5 and new packing placed in the gland 13 without entirely separating the parts. Attention is called to the fact that the collar 16 may be operated on the extension 9 to exert great force on the packing 14 and that the collar 18 may be operated on the collar 16 and secured in place so that the flange 7 will be loosely retained in place thus providing means whereby the joint between the pipe 5 and the globe 8 may be packed to withstand great pressure and without hindering the free rotary movement of the globe relative to the pipe 5.

Having thus illustrated my invention and described the same in detail, what I claim as new and desire to secure by Letters Patent is:—

In a swinging joint, a hollow globe, an inlet and an outlet extension thereon, an inlet pipe rotatably mounted in said inlet extension, an annular flange on said pipe, a collar threaded on said inlet extension, said collar having an inwardly projecting annular flange projecting inwardly against said pipe, a second collar threaded on the first named collar the second collar provided with an inwardly projecting annular flange, the flange on said pipe being positioned between the flanges on said collars.

In testimony whereof I have hereunto set my hand.

JOHN A. ALBERTONI.